(12) United States Patent
Kiadeh et al.

(10) Patent No.: US 8,593,117 B2
(45) Date of Patent: Nov. 26, 2013

(54) DELAY COMPENSATION SYSTEMS AND METHODS FOR DC TO DC CONVERTERS

(75) Inventors: Mansur Kiadeh, Cupertino, CA (US); Paul Latham, Lee, NH (US)

(73) Assignee: Maxin Integrated Products, Inc., San Jose, CA (US)

( * ) Notice: Subject to any disclaimer, the term of this patent is extended or adjusted under 35 U.S.C. 154(b) by 458 days.

(21) Appl. No.: 13/034,005

(22) Filed: Feb. 24, 2011

(65) Prior Publication Data

US 2012/0217940 A1 Aug. 30, 2012

(51) Int. Cl.
*G05F 1/40* (2006.01)

(52) U.S. Cl.
USPC .......................................... 323/271; 323/285

(58) Field of Classification Search
USPC .................. 323/222–225, 268, 271, 282, 285
See application file for complete search history.

(56) References Cited

U.S. PATENT DOCUMENTS 6,313,616 B1 * 11/2001 Deller et al. .................. 323/282
7,729,140 B2 * 6/2010 Ying et al. ...................... 363/41
8,384,363 B2 * 2/2013 Latham et al. ................ 323/224

OTHER PUBLICATIONS

Abe, N. et al., "Smith Predictor Control and Internal Model Control—A Tutorial—", SICE Annual Conference in Funkui, Fukui Universtiy, Japan, PR0001/03/0000-1257 Aug. 4-6, 2003, p. 1383-1387.

* cited by examiner

*Primary Examiner* — Matthew Nguyen

(57) ABSTRACT

A control system for a DC to DC converter includes a predicted state generator module, a voltage estimation module, an error module, and a pulse width modulation (PWM) module. During a prior sampling period, the predicted state generator module generates a predicted capacitor voltage and a predicted capacitor current for a current sampling period. The voltage estimation module generates an estimated value of an output voltage of the DC to DC converter during the current sampling period based on the predicted capacitor current, the predicted capacitor voltage, a delay value, and a duty cycle value for the prior sampling period. The error module generates a voltage error value based on difference between a measured value of the output voltage and the estimated value. The PWM module controls the duty cycle of the DC to DC converter based on the voltage error value.

20 Claims, 6 Drawing Sheets

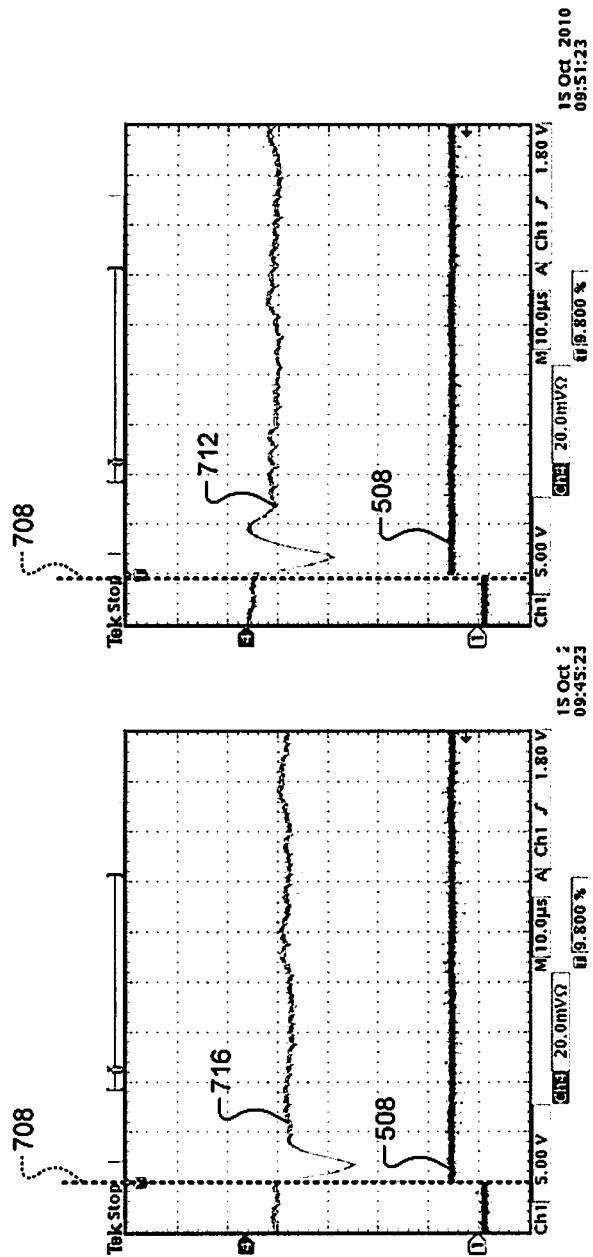

DELAY COMPENSATION SYSTEMS AND METHODS FOR DC TO DC CONVERTERS

FIELD

The present disclosure relates to control systems for power supplies and more particularly to systems and methods for direct current (DC) to DC buck converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply outputs a predetermined voltage that may be used to power one or more components. For example, the predetermined voltage may power one or more components of an integrated circuit (IC). In some situations, however, a voltage that is less than the predetermined voltage may be sufficient. The lower voltage may be obtained from the predetermined voltage using a voltage divider circuit. Voltage divider circuits, however, are inefficient and inaccurate.

A step-down ("buck") converter may be implemented to provide the lower voltage. Under a given set of conditions, a buck converter is generally more efficient and more accurate than a voltage divider circuit. A buck converter may include an inductor, a capacitor, and two switches. The buck converter alternates between charging the inductor by connecting the inductor to the predetermined voltage and discharging the inductor to a load.

SUMMARY

A control system for a DC to DC converter includes a predicted state generator module, a voltage estimation module, an error module, and a pulse width modulation (PWM) module. During a prior sampling period, the predicted state generator module generates a predicted capacitor voltage and a predicted capacitor current for a current sampling period. The voltage estimation module generates an estimated value of an output voltage of the DC to DC converter during the current sampling period based on the predicted capacitor current, the predicted capacitor voltage, and a duty cycle value for the prior sampling period. The error module generates a voltage error value based on difference between a measured value of the output voltage and the estimated value. The PWM module controls the duty cycle of the DC to DC converter based on the voltage error value.

A control method for a DC to DC converter, includes: during a prior sampling period, generating a predicted capacitor voltage and a predicted capacitor current for a current sampling period; generating an estimated value of an output voltage of the DC to DC converter during the current sampling period based on the predicted capacitor current, the predicted capacitor voltage, and a duty cycle value for the prior sampling period; generating a voltage error value based on difference between a measured value of the output voltage and the estimated value; and controlling the duty cycle of the DC to DC converter based on the voltage error value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6A-6B are example graphs of voltage output of a buck converter as functions of time before and after a load step.

DETAILED DESCRIPTION

Figure 1:
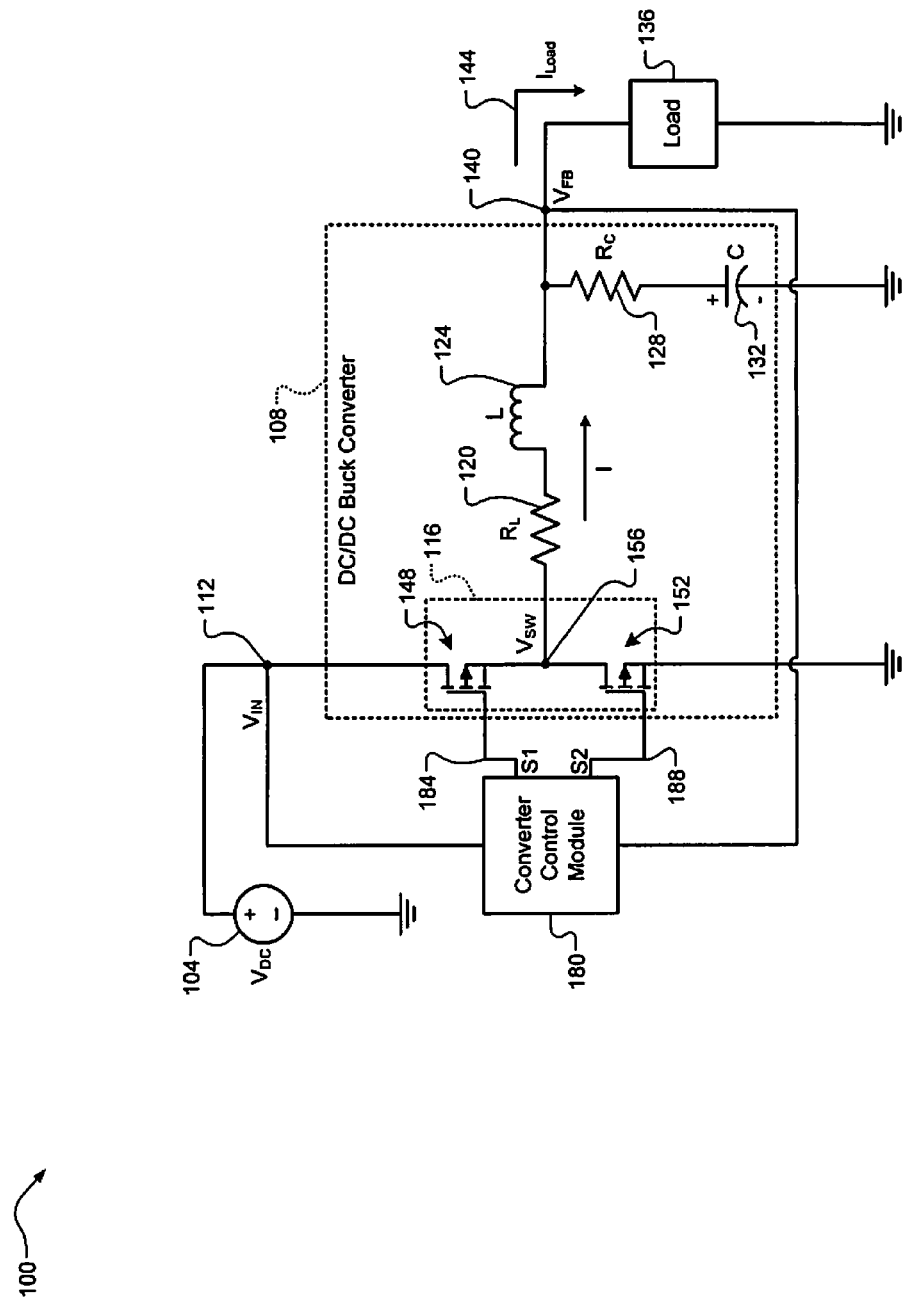
FIG. 1 is a functional block diagram of an example direct current (DC) to DC buck converter system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A direct current (DC) to DC buck (or step-down) converter receives an input voltage and generates an output voltage that is less than the input voltage. A converter control module controls switching of one or more switches of the buck converter based on a difference between a measured value of the output voltage at a sampling time and an estimated value of the output voltage for the sampling time. The converter control module generates the estimated value for the sampling time based on a predicted capacitor current for the sampling time and a predicted capacitor voltage for the sampling time.

Some amount of delay is typically associated with a given buck converter. For example only, a first delay may be attributable to a period between measuring the output voltage and generating the measured value, a second delay may be attributable to determining how to control the switching, and a third delay may be attributable to transitioning a switch from on to off or vice versa.

A converter control module of the present disclosure generates the estimated value of the output voltage for a given sampling time (n) based on a delay parameter. The delay parameter is set based on the second and third delays. Generating the estimated value based on the delay parameter reduces the period between when a change in load occurs and when the output voltage returns to a desired or commanded voltage.

Referring now to FIG. 1, a diagram of an example implementation of a direct current (DC) to DC buck converter system 100 is shown. A DC power source 104 inputs DC power to a DC to DC buck converter 108. A voltage input to the buck converter 108 will be referred to as an input voltage ($V_{IN}$) 112. The buck converter 108 may include a switching module 116, a first resistor ($R_L$) 120, an inductor (L) 124, a second resistor ($R_C$) 128, and a capacitor (C) 132. The buck converter 108 outputs DC power to a load 136. The voltage output by the buck converter 108 may be provided as a feedback voltage ($V_{FB}$) 140. The current through the load 136 will be referred to as a load current ($I_{LOAD}$)) 144. In various implementations, a DC to DC buck converter (not shown) may include one or more buck converters, such as the buck converter 108, connected in parallel to collectively output DC power to the load 136.

The switching module 116 includes a first switch 148 and a second switch 152. For example only, the first and second switches 148 and 152 may be field effect transistors (FETs) as shown in the example of FIG. 1. In various implementations, such as in the example of FIG. 1, the first and second switches 148 and 152 may be p-type, enhancement FETs. The first and/or the second switch 148 and 152 may be another suitable type of switch.

In the example of FIG. 1, a source terminal of the first switch 148 is connected to the input voltage 112, and a drain terminal of the first switch 148 is connected to a source terminal of the second switch 152. The drain terminal of the second switch 152 is connected to ground. A first end of the first resistor 120 is connected to a first end of the inductor 124, and a second end of the first resistor 120 is connected to a node 156 between the drain terminal of the first switch 148 and the source terminal of the second switch 152. A voltage at the node 156 will be referred to as a switching voltage ($V_{SW}$). A second end of the inductor 124 is connected to a first end of the second resistor 128, and a second end of the second resistor 128 may be connected to an anode of the capacitor 132. A cathode of the capacitor 132 may be connected to ground.

The feedback voltage 140 may be measured at a node between the inductor 124 and the second resistor 128. The switching module 116 controls connection and disconnection of the inductor 124 and the input voltage 112. Gate terminals of the first and second switches 148 and 152 are connected to a converter control module 180. In various implementations, such as implementations where the load current is less than a predetermined current (e.g., 5 amps), the converter control module 180 and the buck converter 108 may be implemented on one chip. In other implementations, such as in implementations where the load current is greater than the predetermined current, the buck converter 108 may be implemented independently of the converter control module 180.

The converter control module 180 controls operation of the first and second switches 148 and 152. The converter control module 180 controls first and second switches 148 and 152 using pulse width modulation (PWM). More specifically, the converter control module 180 generates first and second PWM signals 184 and 188 (S1 and S2) that are applied to the gate terminals of the first and second switches 148 and 152, respectively.

The converter control module 180 varies the duty cycle of the first and second PWM signals 184 and 188 to control the output of the buck converter 108. The duty cycle of a signal may refer to a percentage of a predetermined period (e.g., a control loop) during which the signal is in an active state.

The converter control module 180 may generate the first and second PWM signals 184 and 188 such that the first and second PWM signals 184 and 188 are substantially complementary. In other words, the first PWM signal 184 applied to the gate terminal of the first switch 148 is generally opposite in polarity to the second PWM signal 188 provided to the second switch 152. A short circuit condition may occur when both of the first and second switches 148 are on. For example only, a short circuit condition may occur when one of the first and second switches 148 and 152 is switched on before the other of the first and second switches 148 and 152 is switched off. To avoid a short circuit condition, the first and second switches 148 and 152 may both be turned off during a deadtime period before one of the first and second switches 148 and 152 is turned on. Therefore, two signals being substantially complementary may mean that the two signals are opposite in polarity most of the time during switching. However, around transitions, the first and second PWM signals 184 and 188 may be in the same state for a short period.

When the first switch 148 is on and the second switch 152 is off, the inductor 124 is connected to the input voltage 112, thereby charging the inductor 124 and the capacitor 132. When the first switch 148 is off and the second switch 152 is on, the inductor 124 is disconnected from the input voltage 112, and the inductor 124 and the capacitor 132 discharge energy. The converter control module 180 may control the first and second PWM signals 184 and 188 to maintain the feedback voltage 140 at approximately a predetermined (e.g., commanded or desired) voltage. The predetermined voltage is less than the input voltage 112.

Generally, for every circuit that generates an output based on an input, a delay period exists between a time that a change in the input is made and a time that the output reflects the change in the input. For the buck converter system 100, for example, there is a delay period between a time that the converter control module 180 changes the duty cycle and a time that the output of the buck converter 108 reflects the change in the duty cycle. For example only, in the buck converter system 100, the delay period may include: a first delay period associated with measuring the feedback voltage 140 and generating a discrete value based on the feedback voltage 140; a second delay period associated with determining and outputting the duty cycle; and a third delay period associated with transitioning a switch from on to off or vice versa. The first delay period will be referred to as an analog to digital conversion (ADC) delay, the second delay period will be referred to as a computation delay, and the third delay period will be referred to as a switching delay.

The converter control module 180 samples the feedback voltage 140 at sampling times that are each separated by a predetermined period. In other words, the converter control module 180 samples the feedback voltage 140 at predetermined intervals. The converter control module 180 also generates estimates of the feedback voltage 140 at the sampling times, respectively. The converter control module 180 controls the duty cycle in closed-loop based on the feedback voltage 140 and the estimate of the feedback voltage 140 at a given sampling time (n).

A change (i.e., decrease or increase) in the load current 144 may cause a change in the feedback voltage 140. The converter control module 180 may change the duty cycle in response to the change in the feedback voltage 140. However, the computation and switching delays may prevent the converter control module 180 from responding to the change in the feedback voltage 140 in a timely manner.

The converter control module 180 of the present disclosure generates the estimates of the feedback voltage 140 based on the computation and switching delays. Estimating the feedback voltage 140 based on the computation and switching delays improves the ability of the converter control module 180 to respond to changes in the load current 144 and the feedback voltage 140 without the need to add hardware (e.g., a capacitor) and/or substantially increasing the computational intensity of generating the estimates.

Figure 2:
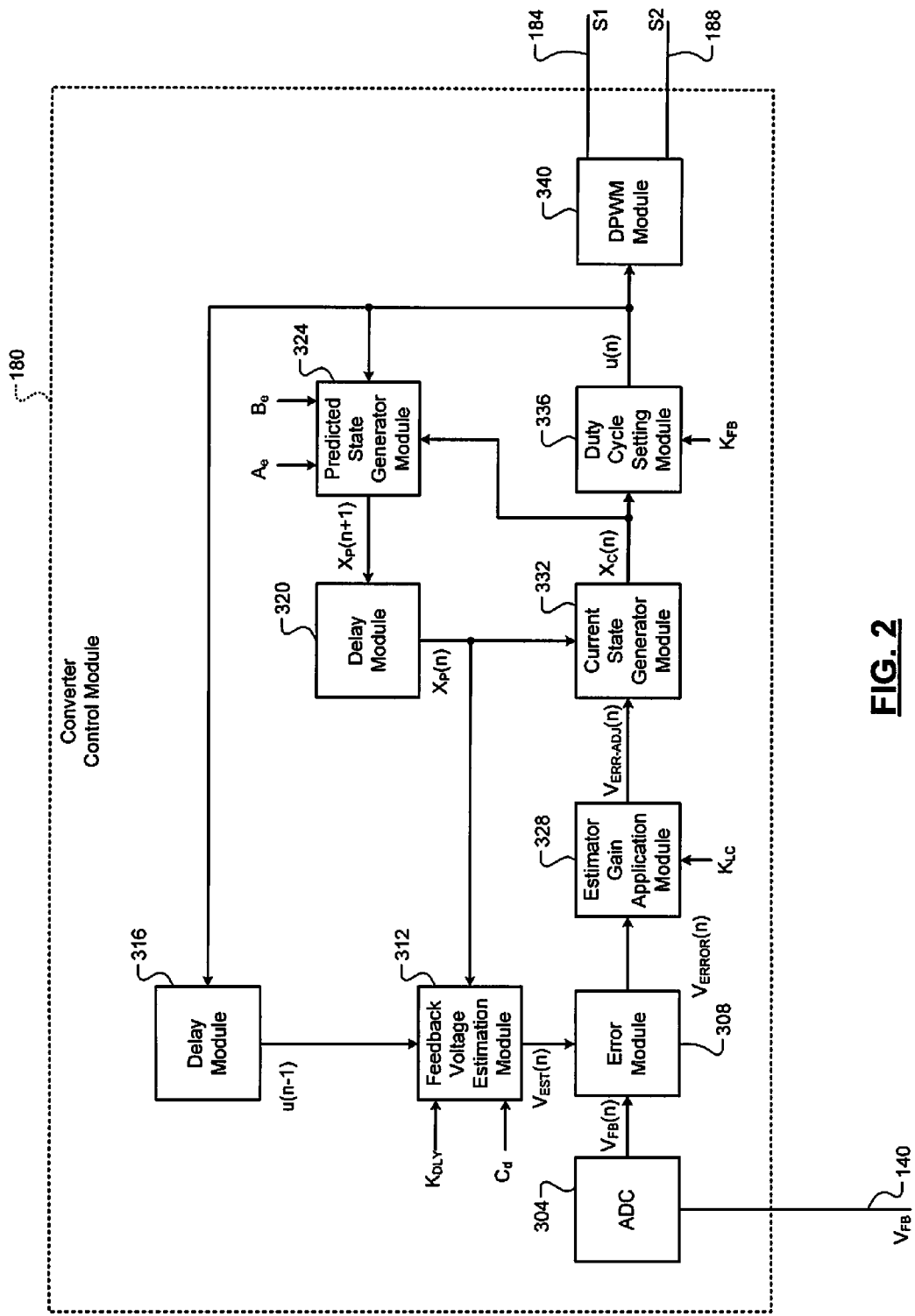
FIG. 2 is a functional block diagram of an example of a converter control module according to the present disclosure.

Referring now to FIG. 2, a functional block diagram of an example implementation of the converter control module 180 is presented. The converter control module 180 may include an analog to digital converter (ADC) 304, an error module 308, a feedback voltage estimation module 312, delay modules 316 and 320, and a predicted state generator module 324. The converter control module 180 may also include an estimator gain application module 328, a current state generator module 332, a duty cycle setting module 336, and a digital PWM (DPWM) module 340.

The ADC 304 samples the feedback voltage 140 at a predetermined sampling rate (i.e., at predetermined intervals). For a given sampling time (n), the ADC 304 generates a feedback voltage value $V_{FB}$ based on the feedback voltage 140.

Based on the buck converter 108, the following linear (continuous) equations can be derived:

$$L\frac{di(t)}{dt} = v_{SW}(t) - R_L i(t) - v_{FB}(t);$$

$$C\frac{dv(t)}{dt} = i(t) - i_{LOAD}(t);$$

and $$v_{FB}(t) = v(t) + R_C(i(t) - i_{LOAD}(t)),$$

where L is the inductance of the inductor 124, $v_{SW}(t)$ is the switching voltage at the node 156 at a given time (t), $R_L$ is the resistance of the first resistor 120, C is the capacitance of the capacitor 132, i(t) is the current through the inductor 124 at the given time (t), $v_{FB}(t)$ is the feedback voltage 140 at the given time (t), v(t) is the capacitor voltage at the given time (t), $i_{LOAD}(t)$ is the load current 144 at the given time (t), and $R_C$ is the resistance of the second resistor 128.

The linear equations can be re-written in matrix form as:

$$\frac{d}{dt}\begin{bmatrix} v(t) \\ i(t) \end{bmatrix} = \begin{bmatrix} 0 & \frac{1}{C} \\ \frac{-1}{L} & \frac{-(R_c+R_L)}{L} \end{bmatrix}\begin{bmatrix} v(t) \\ i(t) \end{bmatrix} + \begin{bmatrix} 0 & \frac{-1}{C} \\ \frac{1}{L} & \frac{R_C}{L} \end{bmatrix}\begin{bmatrix} v_{SW}(t) \\ I_{LOAD}(t) \end{bmatrix} =$$

$$A_c x(t) + B_c u(t);$$

and $$v_{FB}(t) = [1 \quad R_C] x(t) = C_c x(t),$$

where $A_C$, $B_C$, and $C_c$ are continuous matrices, and u(t) corresponds to the duty cycle of the first PWM signal 184 at the given time (t). For example only, $$A_c = \begin{bmatrix} 0 & \frac{1}{C} \\ \frac{-1}{L} & \frac{-Rt}{L} \end{bmatrix};$$

$$B_c = \begin{bmatrix} 1 \\ \frac{1}{L} \end{bmatrix};$$

and $$C_c = [1 \quad Rc],$$

where Rc is the equivalent series resistance (ESR) of the capacitor 132, and Rt is equal to the sum of $R_{FET}$ and Rc. $R_{FET}$ is the total RDS(on) of the first and second switches 148 and 152.

The matrix form equations can be re-written in continuous state space form for a given time (t) as:

$$\frac{dx(t)}{dt} = A_c \cdot x(t) + B_c \cdot u(t);$$

and $$V_{FB} = C_c \cdot x(t).$$

The continuous state space equations can be re-written for a given sampling time (n) in the discrete domain as:

$$X_P(n+1) = A_d \cdot X_C(n) + B_d \cdot u(n); \text{ and}$$

$$v_{FB}(n) = C_d \cdot X_C(n),$$

where $X_C(n)$ is a 2×1 matrix with entries representing current (i.e., present) values of the capacitor voltage and the capacitor current at the given sampling time (n), $X_P(n+1)$ is a 2×1 matrix with entries representing predicted values of the capacitor voltage and the capacitor current at a next sampling time (n+1) after the given sampling time (n), and u(n) corresponds to the duty cycle of the first PWM signal 184 at the given sampling time (n). $A_d$, $B_d$, and $C_d$ are discrete matrices corresponding to the continuous matrices $A_c$, $B_c$, and $C_c$, respectively. For example only, $A_d$, $B_d$, and $C_d$ can be represented by:

$$A_d = \begin{bmatrix} 1 & wnts \\ -wnts & 1 \end{bmatrix};$$

$$B_d = \begin{bmatrix} \frac{wnts^2}{2} \\ wnts \end{bmatrix};$$

and $$C_d = [1 \quad Rc],$$

where Rc is the equivalent series resistance (ESR) of the capacitor 132, and:

$$wnts = \frac{T_s}{\sqrt{\frac{L}{C}}}.$$

$T_s$ is the sampling time of the converter control module 180, L is the inductance of the inductor 124, and C is the capacitance of the capacitor 132.

The error module 308 generates a voltage error value ($V_{ERROR}$) for the given sampling time (n) based on the feedback voltage value for the given sampling time (n) and an estimated value ($V_{EST}$) of the feedback voltage value for the given sampling time (n). For example only, the error module 308 may set the voltage error value equal to the feedback voltage value minus the estimated value. The voltage error value is used to control the duty cycle of the first and second PWM signals 184 and 188 in closed loop operation.

The feedback voltage estimation module 312 generates the estimated value for the given sampling time (n) based on a predicted state of the output of the buck converter 108 at the given sampling time ($X_P(n)$), the duty cycle for the last sampling time before the given sampling time (u(n−1)), and a delay parameter ($K_{DLY}$). The last sampling time before the given sampling time (n) may be represented as n−1.

For example only, the feedback voltage estimation module 312 may generate the estimated value for the given sampling time (n) using the equation:

$$V_{EST}(n) = C_d \cdot X_P(n) + K_{DLY} \cdot u(n-1),$$

where $V_{EST}(n)$ is the estimated value for the given sampling time (n), $C_d$ is the 1×2 matrix for the discrete domain, $X_P(n)$ is a 2×1 matrix representing the predicted state of the output of the buck converter 108 at the given sampling time (n), $K_{DLY}$ is the delay parameter, and u(n−1) is the duty cycle at the last sampling time (n−1). The entries of the 2×1 matrix representing the predicted state of the output of the buck converter 108 at the given sampling time (n) may include an entry for the capacitor voltage and an entry for the capacitor current. The delay parameter may be a predetermined value set based on the computation and switching delays. In various implementations, such as for adaptive systems, the delay parameter may be variable.

In various implementations, the feedback voltage estimation module 312 may generate the estimated value for the given sampling time (n) using the equation:

$$V_{EST}(n) = C_e \cdot X_P(n) + K_{DLY} \cdot u(n-1),$$

where $C_e$ is another 1×2 matrix for the discrete domain and corresponds to $C_d$. For example only, $C_e$ may be represented by:

$$C_e = [1 \quad yrc],$$

where $$yrc = RC * Y,$$

and $$Y = \sqrt{\frac{L}{C}}.$$

$C_e$ can also be represented as:

$$C_e = C_c e^{-T_d A_d},$$

where $T_d$ corresponds to the sum of the switching and computation delays. But, $$e^{-T_d A_d} = \begin{bmatrix} 1 & wntd \\ -wntd & 1 \end{bmatrix},$$

where wntd is:

$$wntd = \frac{T_d}{\sqrt{\frac{L}{C}}}.$$

Accordingly, $C_e$ can be re-written as:

$$C_e = [1 \quad yrc] \begin{bmatrix} 1 & wntd \\ -wntd & 1 \end{bmatrix}.$$

This equation for $C_e$ reduces to:

$$C_e = [1 + yrc \cdot wntd \quad yrc - wntd],$$

which can be simplified to:

$$C_e = [1 \quad yrc - wntd].$$

For example only, the delay parameter ($K_{DLY}$) can be represented as:

$$K_{DLY} = -C_c e^{-T_d A_d} \int_0^{T_d} e^{-A_d t} B_d \, dt.$$

But, $$\int_0^{T_d} e^{-A_d t} B_d \, dt = \begin{bmatrix} \frac{wntd}{2} \\ wntd \end{bmatrix}.$$

As described above, $$e^{-T_d A_d} = \begin{bmatrix} 1 & wntd \\ -wntd & 1 \end{bmatrix},$$

and $$C_c = [1 \quad yrc].$$

Therefore, the delay parameter $K_{DLY}$ can be represented by:

$$K_{DLY} = -[\begin{matrix} 1 & yrc \end{matrix}]\begin{bmatrix} 1 & wntd \\ -wntd & 1 \end{bmatrix}\begin{bmatrix} \frac{wntd}{2} \\ wntd \end{bmatrix}.$$

This equation for the delay parameter $K_{DLY}$ reduces to:

$$K_{DLY} = [\begin{matrix} 1 & yrc \end{matrix}]\begin{bmatrix} \frac{wntd}{2} - wntd^2 \\ \frac{wntd^3}{2} + wntd \end{bmatrix},$$

which further reduces to:

$$K_{DLY} = \frac{wntd^2}{2} - wntd^2 + yrc*wntd + yrc*\frac{wntd^3}{2},$$

which can be simplified to:

$$K_{DLY} = yrc*wntd - wntd^2.$$

Accordingly, the feedback voltage estimation module 312 may generate the estimated value for the given sampling time (n) using the equation:

$$V_{EST}(n) = [\begin{matrix} 1 & yrc - wntd \end{matrix}]\begin{bmatrix} X_{P1} \\ X_{P2} \end{bmatrix} + (yrc*wntd - wntd^2)*u(n-1),$$

where, $$X_P(n) = \begin{bmatrix} X_{P1} \\ X_{P2} \end{bmatrix},$$

$X_{P1}$ is the predicted voltage of the capacitor 132 at the given sampling time (n) and $X_{P2}$ is the predicted current at the given sampling time (n).

The delay module 316 provides the duty cycle at the last sampling time (u(n−1)) to the feedback voltage estimation module 312. The delay module 320 provides the predicted state of the output of the buck converter 108 at the given sampling time ($X_P(n)$) to the feedback voltage estimation module 312. The delay modules 316 and 320 may each include one unit (i.e., one sampling period) delay buffers. More specifically, the delay module 316 receives the duty cycle for the present sampling time (u(n)) and delays outputting that duty cycle for one sampling period. The delay module 320 receives the predicted state of the output of the buck converter 108 at a next sampling time ($X_P(n+1)$) after the given sampling time(n) and delays outputting that predicted state for one sampling period.

The predicted state generator module 324 generates the predicted state of the output of the buck converter 108 at the next sample time $X_P(n+1)$ and outputs the predicted state at the next sample time to the delay module 320. The predicted state generator module 324 may generate the predicted state at the next sample time based on the current state of the output of the buck converter 108 at the given sample time ($X_C(n)$) and the duty cycle for the given sample time (u(n)). For example only, the predicted state generator module 324 may generate the predicted state at the next sample time ($X_P(n+1)$) using the equation:

$$X_P(n+1) = A_d \cdot X_c(n) + B_d \cdot u(n),$$

or $$X_P(n+1) = A_e \cdot X_c(n) + B_e \cdot u(n),$$

where $$A_e = \begin{bmatrix} 1 & wnte \\ -wnte & 1 \end{bmatrix},$$

and $$B_e = \begin{bmatrix} \frac{wnte^2}{2} \\ wnte \end{bmatrix},$$

where $$wnte = \frac{T_e}{\sqrt{LC}}.$$

$T_e$ is the sampling rate of the predicted state generator module 324.

The estimator gain application module 328 receives the voltage error value for the given sampling time (n) from the error module 308. The estimator gain application module 328 applies an estimator gain ($K_{LC}$) to the voltage error value and outputs the result for the given sampling time (n) to the current state generator module 332. The estimator gain may be set to adjust the voltage error value based on inaccuracy of the feedback voltage estimation module 312. The estimator gain may be a 2×1 matrix such that the result of:

$$K_{LC}*V_{ERROR}$$

is a 2×1 matrix like the predicted state of the output of the buck converter 108 at the given sampling time ($X_P(n)$). One entry of the 2×1 matrix may be a predetermined value for the capacitor voltage and the other entry may be a predetermined value for the capacitor current. The result of the application of the estimator gain to the voltage error value for the given sampling time (n) will be referred to as the adjusted voltage error value ($V_{ERR-ADJ}(n)$).

The current state generator module 332 determines the current (i.e., present) state of the output of the buck converter 108 for the given sampling time ($X_C(n)$) based on the predicted state of the output of the buck converter 108 at the given sampling time ($X_P(n)$) and the adjusted voltage error value for the given sampling time ($V_{ERR-ADJ}$). For example only, the current state generator module 332 may set the current state of the output of the buck converter 108 for the given sampling time (n) equal to the sum of the predicted state of the output and the adjusted voltage error value.

The duty cycle setting module 336 sets the duty cycle for the given sampling time (u(n)) based on the current state of the output of the buck converter 108 ($X_C(n)$) and a feedback gain ($K_{FB}$). For example only, the duty cycle setting module 336 may set the duty cycle using the equation:

$$u(n) = K_{FB}*X_C(n),$$

where $K_{FB}$ is a 2×1 matrix. In various implementations, one entry of the 2×1 matrix may be a predetermined value for the capacitor voltage and the other entry may be a predetermined value for the capacitor current.

The DPWM module 340 generates the first and second PWM signals 184 and 188 based on the duty cycle. In various implementations, the duty cycle may be a value corresponding to a percentage between 0 percent and 100 percent. For example only, the DPWM module 340 may set the duty cycle of the first PWM signal 184 equal to or based on the duty cycle. The DPWM module 340 may set the duty cycle of the second PWM signal 188 to be substantially complementary to the first PWM signal 184.

Figure 3:
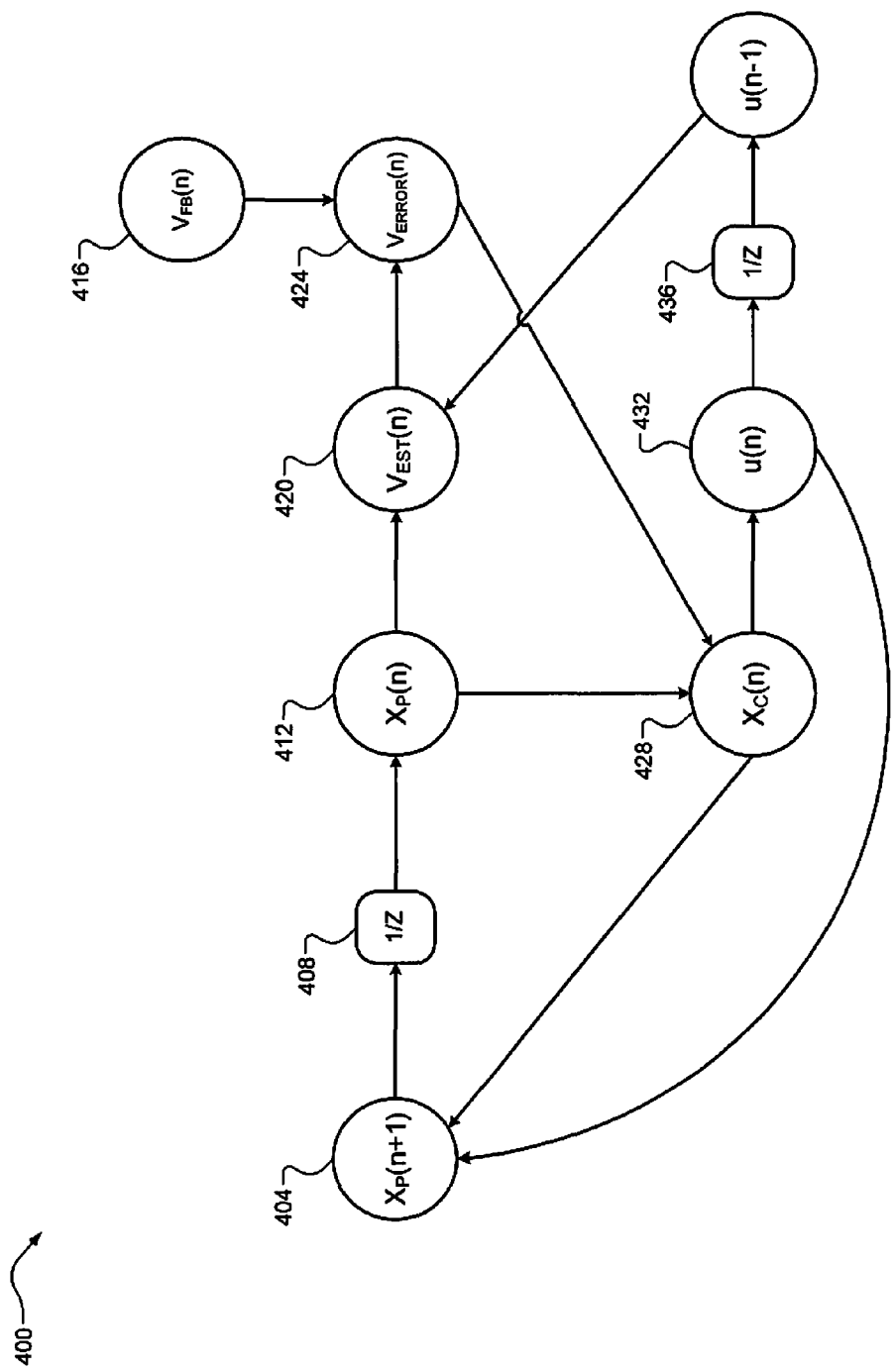
FIG. 3 is a flow diagram depicting an example method of estimating an output of a DC to DC buck converter according to the present disclosure.

Referring now to FIG. 3, a flowchart depicting an example method 400 of estimating the feedback voltage 140 of the buck converter 108 is presented. At 404, control generates the predicted state of output of the buck converter 108 at the next sampling time ($X_P(n+1)$) based on the current state of the output of the buck converter 108 at the present sampling time ($X_C(n)$) and the duty cycle at the present sampling time ($u(n)$). For example only, control may set the predicted state of the output of the buck converter at the next sampling time using the equation:

$$X_P(n+1) = A_d \cdot X_C(n) + B_d \cdot u(n)$$

where $X_C(n)$ is a 2×1 matrix with entries representing the values of the capacitor voltage and the capacitor current at the present sampling time, $X_P(n+1)$ is a 2×1 matrix with entries representing predicted values of the capacitor voltage and the capacitor current at the next sampling time (n+1), u(n) corresponds to the duty cycle of the first PWM signal 184 at the present sampling time, $A_d$ is a 2×2 matrix for discrete domain, and $B_d$ is a 2×1 matrix for the discrete domain.

Control delays the use of the predicted state of output of the buck converter 108 by one sampling period at 408. Control receives the predicted state of the output of the buck converter 108 at the present sampling time ($X_P(n)$) at 412 (generated as $X_P(n+1)$ at the last sampling time). Control also receives the feedback voltage value at the present sampling time ($V_{FB}(n)$) at 416.

Control generates the estimated value of the feedback voltage value at 420 based on the predicted state of the output of the buck converter 108 at the present sampling time ($X_P(n)$) and the duty cycle at the last sampling time ($u(n-1)$). For example only, control may generate the estimated value of the feedback voltage using the equation:

$$V_{EST}(n) = C_e \cdot X_P(n) + K_{DLY} \cdot u(n-1).$$

Control generates the voltage error value for the present sampling time ($V_{ERROR}(n)$) at 424 based on the feedback voltage value for the present sampling time ($V_{FB}(n)$) and the estimated value of the feedback voltage value for the present sampling time ($V_{EST}(n)$). For example only, control may set the voltage error value equal to the feedback voltage value minus the estimated value.

Control generates the current state of the output of the buck converter 108 at the present sampling time ($X_C(n)$) at 428 based on the voltage error value ($V_{ERROR}(n)$) and predicted state of the output of the buck converter 108 at the present sampling time ($X_P(n)$). For example only, control may apply the estimator gain ($K_{LC}$) to the voltage error value to generate the adjusted voltage error value and set the current state of the output equal to the sum of the predicted state of the output and the adjusted voltage error value. The estimator gain may be a 2×1 matrix, and the current state of the output of the buck converter 108 may be a 2×1 matrix.

Control generates the duty cycle for the present sampling time (u(n)) at 432 based on the current state of the output of the buck converter 108 at the present sampling time ($X_C(n)$). For example only, control may generate the duty cycle using the equation:

$$u(n) = K_{FB} * X_C(n),$$

where $K_{FB}$ is a 2×1 matrix. Control delays use of the duty cycle for the present sampling time at 436 by one predetermined time interval. In this manner, at the next sampling time, control will generate the estimated value of the feedback voltage based on the duty cycle for the present sampling time.

Figure 4:
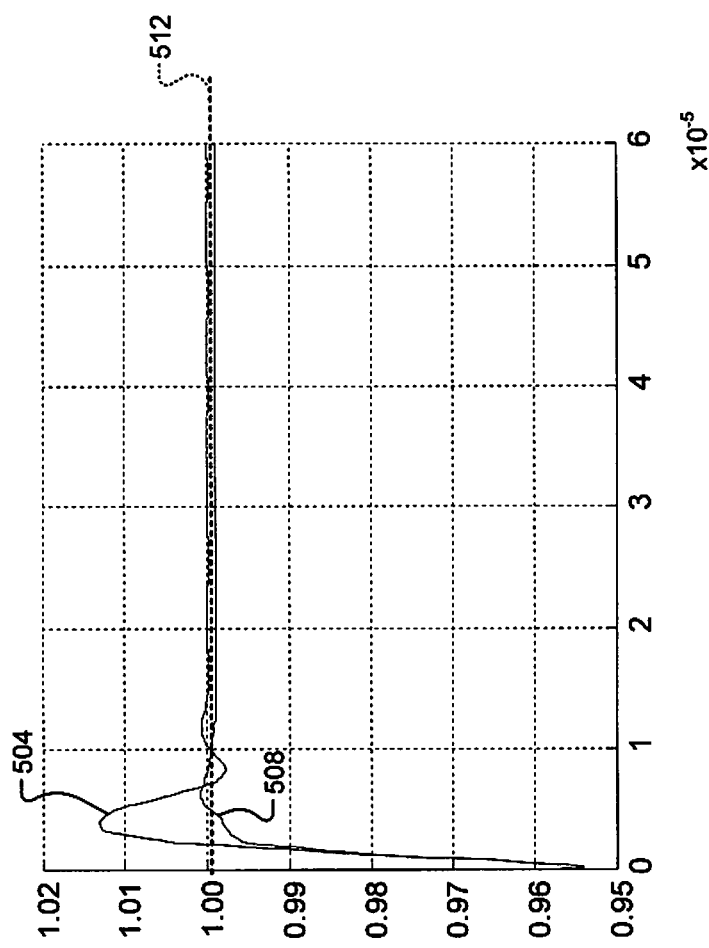
FIG. 4 is an example graph of voltage output of a buck converter as a function of time after a load step.

Referring now to FIG. 4, an example graph of the feedback voltage 140 as a function of time is presented. A change in the load 136 occurs at approximately time zero. Example trace 504 tracks the feedback voltage 140 in an implementation where the converter control module 180 does not generate the estimated value of the feedback voltage value at a given sample time based on the computation and switching delays. Example trace 508 tracks the feedback voltage 140 in an implementation where the converter control module 180 generates the estimated value of the feedback voltage value based on the computation and switching delays. Line 512 corresponds to an example desired value of the feedback voltage 140. As illustrated in the example of FIG. 4, generating the estimated value of the feedback voltage based on the computation and switching delays enables the converter control module 180 to return the feedback voltage 140 to the desired or commanded value quickly after a change in the load 136 while minimizing over and undershoot.

Figure 5:
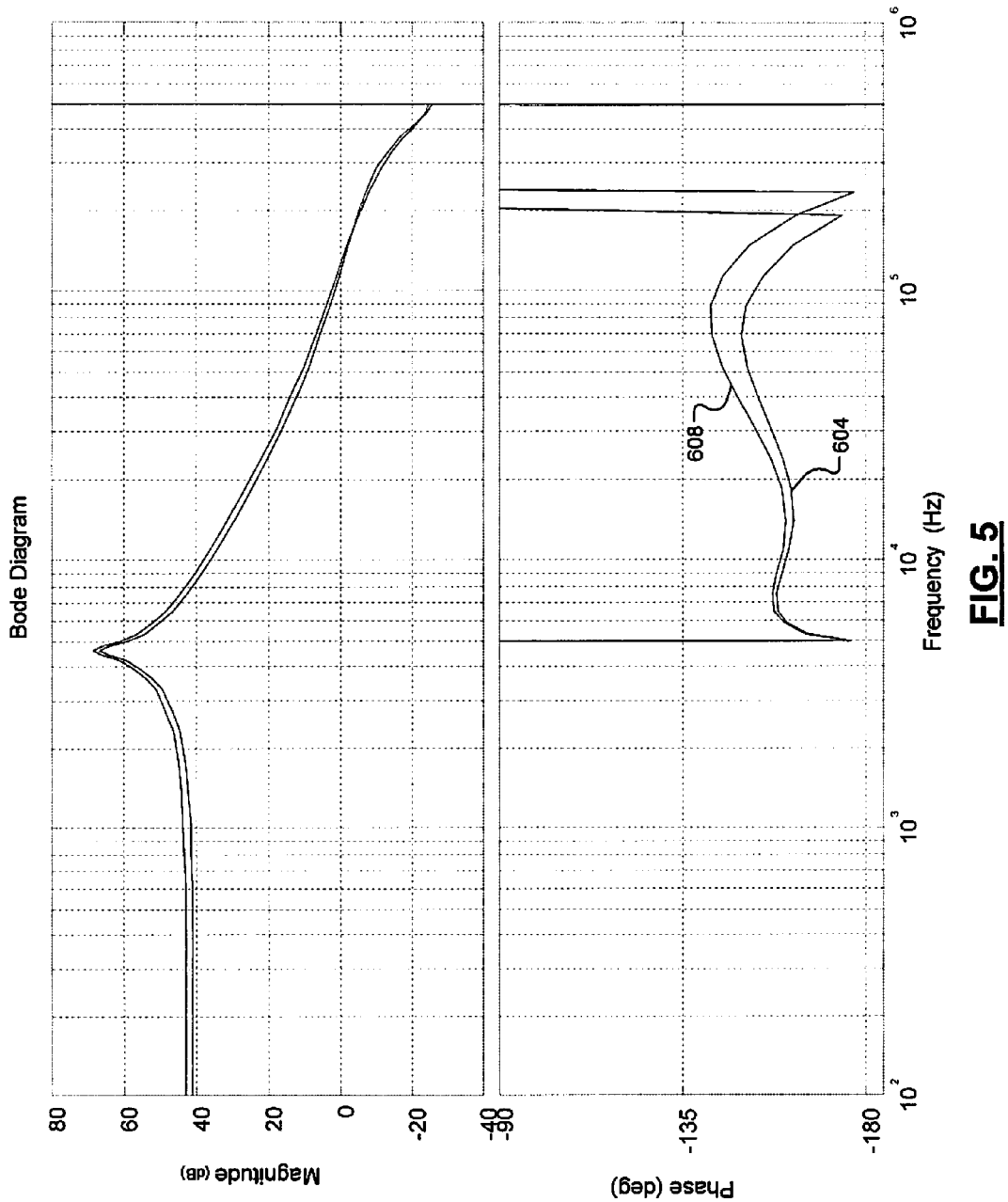
FIG. 5 is an example Bode plot comparing open loop transfer functions.

Referring now to FIG. 5, an example Bode plot is presented. Example trace 604 tracks the feedback voltage 140 in an implementation where the converter control module 180 does not generate the estimated value of the feedback voltage value at a given sample time based on the computation and switching delays. Example trace 608 tracks the feedback voltage 140 in an implementation where the converter control module 180 generates the estimated value of the feedback voltage value based on computation and switching delays. As FIG. 6 illustrates, generating the estimated value of the feedback voltage based on the computation and switching delays provides increased phase margin (PM) and a decreased bandwidth. Generating the estimated value of the feedback voltage based on the computation and switching delays may provide an increased PM relative at a given bandwidth relative to generating the estimated value of the feedback voltage independent of the computation and switching delays.

Referring now to FIGS. 6A-6B, example graphs of the feedback voltage 140 as functions of time are presented. Example traces 704 track the magnitude of the load 136. A change in the load occurs at approximately times 708. Example trace 712 tracks the feedback voltage 140 in an implementation where the converter control module 180 does not generate the estimated value of the feedback voltage value at a given sample time based on the computation and switching delays. Example trace 716 tracks the feedback voltage 140 in an implementation where the converter control module 180 generates the estimated value of the feedback voltage value based on the computation and switching delays. As illustrated in the example of FIGS. 6A-6B, generating the estimated value of the feedback voltage based on the computation and switching delays enables the converter control module 180 to return the feedback voltage 140 to the desired value as fast as possible and with as little over and undershoot as possible after a change in the load 136 occurs.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a DC to DC converter, comprising:
   a predicted state generator module that, during a prior sampling period, generates a predicted capacitor voltage and a predicted capacitor current for a current sampling period;

a voltage estimation module that generates an estimated value of an output voltage of the DC to DC converter during the current sampling period based on the predicted capacitor current, the predicted capacitor voltage, and a duty cycle value for the prior sampling period;

an error module that generates a voltage error value based on difference between a measured value of the output voltage and the estimated value; and a pulse width modulation (PWM) module that controls the duty cycle of the DC to DC converter based on the voltage error value.

2. The control system of claim 1 wherein the voltage estimation module sets a first value equal to a sum of a first product of the predicted capacitor voltage and a predetermined voltage estimation value and a second product of the predicted capacitor current and a predetermined current estimation value, and wherein the voltage estimation module generates the estimated value based on the first value, a predetermined delay value, and the duty cycle value.

3. The control system of claim 2 wherein the voltage estimation module sets a second value equal to a third product of the predetermined delay value and the duty cycle value, and wherein the voltage estimation module sets the estimated value equal to a second sum of the first and second values.

4. The control system of claim 1 wherein the voltage estimation module sets a first value equal to a product of a predetermined delay value and the duty cycle value, and wherein the voltage estimation module sets the estimated value based on the predicted capacitor voltage, the predicted capacitor current, and the first value.

5. The control system of claim 1 further comprising:

a current state generator module that generates a present capacitor voltage and a present capacitor current for the current sampling period based on the predicted capacitor voltage and the predicted capacitor current, respectively, and based on the voltage error value; and a duty cycle setting module that generates a second duty cycle value for the current sampling period based on the present capacitor voltage and the present capacitor current, wherein the PWM module controls switching of the DC to DC converter based on the second duty cycle value.

6. The control system of claim 5 further comprising an estimator gain application module that generates an estimated capacitor voltage for the current sampling period based on the voltage error value and that generates an estimated capacitor current for the current sampling period based on the voltage error value, wherein the current state generator module generates the present capacitor voltage based on the predicted capacitor voltage and the estimated capacitor voltage and generates the present capacitor current based on the predicted capacitor current and the estimated capacitor current.

7. The control system of claim 6 wherein the current state generator module sets the present capacitor voltage equal to a first sum of the predicted capacitor voltage and the estimated capacitor voltage and sets the present capacitor current equal to a second sum of the predicted capacitor current and the estimated capacitor current.

8. The control system of claim 5 wherein the duty cycle setting module generates the second duty cycle value further based on a predetermined feedback voltage value and a predetermined feedback current value.

9. The control system of claim 8 wherein the duty cycle setting module sets the second duty cycle value equal to a sum of a first product of the predetermined feedback voltage value and the present capacitor voltage and a second product of the predetermined feedback current value and the present capacitor current.

10. The control system of claim 1 wherein the predicted state generator module generates the predicted capacitor voltage and the predicted capacitor current based on a present capacitor voltage and a present capacitor current for the prior sampling period, respectively.

11. A control method for a DC to DC converter, comprising:

during a prior sampling period, generating a predicted capacitor voltage and a predicted capacitor current for a current sampling period;

generating an estimated value of an output voltage of the DC to DC converter during the current sampling period based on the predicted capacitor current, the predicted capacitor voltage, and a duty cycle value for the prior sampling period;

generating a voltage error value based on difference between a measured value of the output voltage and the estimated value; and controlling the duty cycle of the DC to DC converter based on the voltage error value.

12. The control method of claim 11 further comprising:

setting a first value equal to a sum of a first product of the predicted capacitor voltage and a predetermined voltage estimation value and a second product of the predicted capacitor current and a predetermined current estimation value; and generating the estimated value based on the first value, a predetermined delay value, and the duty cycle value.

13. The control method of claim 12 further comprising:

setting a second value equal to a third product of the predetermined delay value and the duty cycle value; and setting the estimated value equal to a second sum of the first and second values.

14. The control method of claim 11 further comprising:

setting a first value equal to a product of a predetermined delay value and the duty cycle value; and setting the estimated value based on the predicted capacitor voltage, the predicted capacitor current, and the first value.

15. The control method of claim 11 further comprising:

generating a present capacitor voltage and a present capacitor current for the current sampling period based on the predicted capacitor voltage and the predicted capacitor current, respectively, and based on the voltage error value;

generating a second duty cycle value for the current sampling period based on the present capacitor voltage and the present capacitor current; and controlling switching of the DC to DC converter based on the second duty cycle value.

16. The control method of claim 15 further comprising:

generating an estimated capacitor voltage for the current sampling period based on the voltage error value;

generating an estimated capacitor current for the current sampling period based on the voltage error value;

generating the present capacitor voltage based on the predicted capacitor voltage and the estimated capacitor voltage; and generating the present capacitor current based on the predicted capacitor current and the estimated capacitor current.

17. The control method of claim 16 further comprising:
setting the present capacitor voltage equal to a first sum of the predicted capacitor voltage and the estimated capacitor voltage; and
setting the present capacitor current equal to a second sum of the predicted capacitor current and the estimated capacitor current.

18. The control method of claim 15 further comprising generating the second duty cycle value further based on a predetermined feedback voltage value and a predetermined feedback current value.

19. The control method of claim 18 further comprising setting the second duty cycle value equal to a sum of a first product of the predetermined feedback voltage value and the present capacitor voltage and a second product of the predetermined feedback current value and the present capacitor current.

20. The control method of claim 11 further comprising generating the predicted capacitor voltage and the predicted capacitor current based on a present capacitor voltage and a present capacitor current for the prior sampling period, respectively.

* * * * *

UNITED STATES PATENT AND TRADEMARK OFFICE
CERTIFICATE OF CORRECTION

| | | |
|---|---|---|
| PATENT NO. | : 8,593,117 B2 | Page 1 of 1 |
| APPLICATION NO. | : 13/034005 | |
| DATED | : November 26, 2013 | |
| INVENTOR(S) | : Mansur Kiadeh | |

It is certified that error appears in the above-identified patent and that said Letters Patent is hereby corrected as shown below:

Title Page, Column 1,

Assignee (73)  Delete "Maxin" and insert --Maxim--

Title Page, Column 2,

Other Publications, Line 2  Delete "Funkui," and insert --Fukui,--

In the Specification:

Column 3, Line 37  Delete "($I_{LOAD}$))" and insert --($I_{LOAD}$)--

Column 4, Line 31  After "148", insert --and 152--

Signed and Sealed this
Third Day of June, 2014

Michelle K. Lee
*Deputy Director of the United States Patent and Trademark Office*